United States Patent

Jackson

[11] Patent Number: 5,963,264
[45] Date of Patent: Oct. 5, 1999

[54] SELECTING A DIGITAL TELEVISION PROGRAM AND THE CONTROL OF A NON-ATTACHED RECORDING DEVICE

[75] Inventor: Mark Jackson, Castle Rock, Colo.

[73] Assignee: EchoStar Engineering Corporation, Littleton, Colo.

[21] Appl. No.: 08/961,011

[22] Filed: Oct. 30, 1997

[51] Int. Cl.[6] .................................................. H04N 7/00
[52] U.S. Cl. ............................................ 348/460; 386/83
[58] Field of Search ............................... 348/7, 460, 906, 348/734, 725, 553, 569, 12, 13; 386/83; 455/6.3

[56] References Cited

U.S. PATENT DOCUMENTS

| | | |
|---|---|---|
| 4,706,121 | 11/1987 | Young . |
| 5,293,357 | 3/1994 | Hallenbeck . |
| 5,646,603 | 7/1997 | Nagata et al. ............................. 386/83 |
| 5,657,414 | 8/1997 | Lett et al. ................................. 348/460 |
| 5,686,954 | 11/1997 | Yoshinobu et al. ...................... 348/460 |
| 5,727,060 | 3/1998 | Young ....................................... 386/83 |

*Primary Examiner*—Victor R. Kostak
*Attorney, Agent, or Firm*—Pittenger & Smith, P.C

[57] ABSTRACT

A method and apparatus for wireless control of audio and video recording device operations via selections from an Electronic Programming Guide (EPG) is disclosed. A digital satellite receiving system receives and processes a digital data stream containing television programming information, EPG information, and a list of video cassette recorders (VCRs) and corresponding infrared (IR) codes used to control the listed models of VCRs contained in the list. The VCR list, corresponding IR codes, and EPG information are stored in memory. A user may select a specific model VCR from the list displayed on a viewing screen and the corresponding codes are stored in a memory. The received EPG information may also be displayed on a viewing screen. The user may select for recording an event listing in the EPG, and this selection is also stored in nonvolatile memory. EPG information is repeatedly transmitted in the digital data stream. As scheduling information for the selected event changes the receiving system adjusts the control of the VCR so that the selected event will be recorded in its entirety. The digital receiving system uses the codes saved in nonvolatile memory to generate and transmit an IR signal to the VCR to start recording when the EPG determines the selected event begins. The EPG and selected program are monitored during recording. At the end of the program, a transmitted IR signal terminates the recording operation. Additionally, the receiving system may receive new IR codes via the data stream so new recording devices may be used as they are made available. High powered IR energy signals are broadcasted, in the local area to control the operation of the associated VCR or other remote controlled device without necessity of the IR generator being in the line of sight of the VCR.

16 Claims, 2 Drawing Sheets

SELECTING A DIGITAL TELEVISION PROGRAM AND THE CONTROL OF A NON-ATTACHED RECORDING DEVICE

FIELD OF THE INVENTION

The present invention broadly relates to a television receiving device which controls a Video Cassette Recorder (VCR) or similar television related device. More specifically, the present invention provides a method and apparatus for controlling all models of VCRs via infrared signals by providing the infrared (IR) codes necessary to operate each particular brand and model VCR and real time program scheduling information in the data stream. The present invention also provides a method and apparatus for activating a VCR by saturating the local area with high powered, broadcasted IR signals.

BACKGROUND OF THE INVENTION

Video Cassette Recorders (VCRs) are commonly used by the public to record television programs. In the past, users recorded television programs by manually pressing the RECORD button on the VCR, or programming an event timer in the VCR to activate at a specified time and record a specified television channel for a predetermined time period. Programming the event timer depended upon the VCR's capability to receive the transmitted television signal, maintain an accurate clock, and record the desired program. With the advent of digital television, direct broadcast satellite (DBS) television systems and the Electronic Programming Guide (EPG), the capability to select and control the recording of a television program through a digital television receiver has greatly expanded. An EPG is usually broadcast via satellite or cable television systems and is stored in the television receiver. The EPG contains information corresponding to channel and timeslot, and is usually updated at regular intervals to reflect last minute programming changes or add new timeslots. An EPG may also incorporate numerical codes corresponding to individual programming selections to simplify the recording process, and known as "VCR Plus". However, as currently configured to record a satellite or digital television program, both the television receiver and the VCR must be programmed as to time and desired channel.

In some systems, the infrared (IR) codes for VCRs can only be stored in the memory of the digital satellite receiver (DSR) or digital television receiver at the time of manufacture. Thus, it is not possible to update the codes when a new model VCR is introduced. As the evolution of VCRs is rapid and new models are constantly reaching the market, the programming of IR codes in the receiver at the time of manufacture is not a commercially viable option.

An EPG requires constant updates and additions to be accurate and effective. In satellite television and cable television systems, EPG data is constantly transmitted to the subscriber to maintain an accurate and up to date EPG. Similar techniques could be employed to provide an up to date list of hardware specific IR codes for wider selection of VCRs available to the public.

There is a great need for a television receiver that can receive IR codes from a remote programming source via a data stream, and use these IR codes to control a VCR in real time to automatically record programs selected from an EPG. Similarly, it would be of great benefit if the control of a VCR could be effectuated without an IR generator peripheral to the television receiver which must be in the line of sight of a VCR to actuate it.

INFORMATION DISCLOSURE STATEMENT

The following information is provided in compliance with the inventor's duty to disclose all pertinent information which is relevant to the information which is the subject of this application. The listed patents are believed to be pertinent to the examination of this application.

Hallenbeck (U.S. Pat. No. 5,293,357, issued Mar. 8, 1994) discloses a method and apparatus for controlling a VCR based upon user selections from an online television programming guide. In the '357 patent, however, an event timer is set by a user and controls the recording operations. However, the event timer is not automatically updated if the broadcast time of the selected program changes, as often happens with televised sporting events, and the user may miss the desired viewing selection. The '357 patent also discloses a facility for controlling the VCR via an infrared remote control synthesizer. In such systems, the IR codes for most VCRs are stored in the memory of the receiver at the time of manufacture. Thus, it is not possible to update the code when a new model VCR is introduced. The present invention uses an EPG to control VCR operations rather than a separate event timer, so the event rather than the timeslot is the key information required to control the VCR. Thus, the possibility of missing a desired viewing selection due to a delayed broadcast is eliminated. The present invention also uses a downlinked data stream to receive the IR codes for all VCRs as they become available, so that the receiver does not require replacement or manual updating of the memory by the manufacturer.

Young et al. (U.S. Pat. No. 4,706,121, issued Nov. 10, 1987) also discloses a system for controlling VCR operations via broadcast scheduling information. While the '121 patent uses the broadcast scheduling information to update the times to perform recording operations, control of the VCR is implemented through a wire or cable connection, rather than through IR codes. Thus, the '121 patent also is unable to add new model VCRs as they become available.

SUMMARY OF THE INVENTION

The present invention simplifies the recording of a satellite or off-air television program by providing a means for a television receiver to control the operation of a video cassette recorder (VCR). Instead of programming both the satellite receiver to receive the desired program and the VCR to record it, the present invention eliminates the need to program the VCR. For example, a digital data stream conforming to the MPEG-2 standard contains television programming, an EPG, and hardware specific VCR IR codes. The digital data stream is transmitted from an uplink center to a satellite, which re-directs the data stream to subscribers. The satellite television receiver, at the subscriber site receives and processes the data stream, storing the EPG and hardware specific VCR IR codes in a memory.

A user interface allows a user to designate a particular model of VCR, and the hardware specific VCR IR codes related to the VCR are stored in a nonvolatile memory. The user interface also presents program scheduling information to the user, and allows the user to select from the EPG programs to be recorded by the VCR. These program selections are also stored in nonvolatile memory. Selections are stored in nonvolatile memory to prevent the loss of recording information in the case of a power outage or other event. The satellite receiver continuously monitors the data stream for updates to the EPG so that recording operations may be coordinated to reflect last minute changes to programming schedules. At the time a desired program is to be broadcast, the satellite receiver activates an IR signal generator, and passes to it the hardware specific VCR IR codes selected for the specified VCR model. The satellite receiver then controls the VCR operations by transmitting a high powered, broadcasted IR signal required to control the VCR.

A key feature of the present invention is the ability to provide the IR codes for every model VCR via downlinked data stream. Because the IR codes are included in the data stream, codes for new model VCRs may be provided to users as those models become available, rather than only at the time the television receiver is manufactured. An additional key feature of the present invention is the high powered, broadcasted IR signal transmitted by the television receiver. Because of the high powered, broadcasted nature of the IR signal, the local area is saturated with IR energy actuating and controlling the VCR, without need for a peripheral IR generator placed in the line of sight of the VCR's IR receiver.

Other features and advantages of the present invention will become apparent from the following detailed description of the invention when it is considered in conjunction with the accompanying drawings.

DETAILED DESCRIPTION OF THE DRAWINGS

Figure 1:
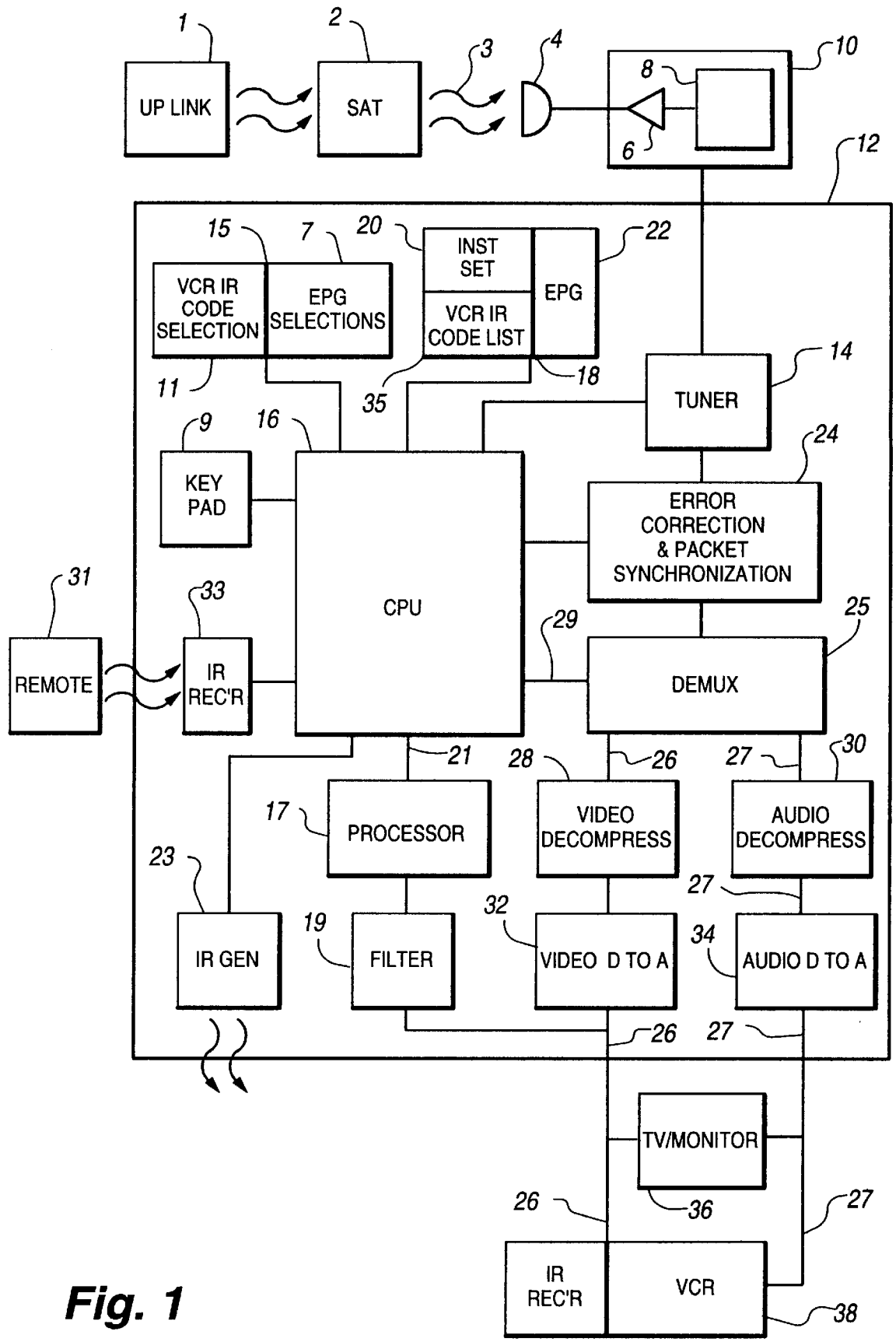
FIG. 1 is a block diagram illustrating the preferred embodiment of the present invention.

FIG. 1 is a block diagram that shows the present invention and related components required to receive and process video and audio information, as well as data. The preferred embodiment of the present invention utilizes a direct broadcast satellite system incorporating packetized transmission according to the MPEG-2 standard, but may be used with any programming source that includes an electronic programming guide. Direct broadcast satellite (DBS) signals are received as downlinked signals 3 by satellite antenna 4, such as a parabolic dish which can have a diameter as small as approximately eighteen to thirty-six inches in diameter. Front end processing of the satellite signal is accomplished by a low noise block down converter feed (LNBF) provided in the antenna focal point. This includes a converter module 10 with a low noise amplifier 6 which receives the signals from the feed and, by means of the down converter 8, converts the entire frequency band of the satellite signals to a lower frequency range which can be transmitted via coaxial cable to the satellite receiver 12. Tuner 14 selects a specific channel from the downlinked signal 3 and feeds it to error correction and packet synchronization module 24. In the preferred embodiment, the error correction and packet synchronization module 24 may combine a QPSK decoder and a Reed-Solomon and Viterbi forward error corrector. The QPSK decoder accepts the digital signals from tuner 14 and converts them to data and checksum bits corresponding to packets in the downlinked signals 3. The forward error correction logic accepts the data and checksum bits and corrects errors that occurred in the transmission of downlinked signals 3. The error correction and packet synchronization module 24 outputs a fully compliant MPEG-2 transport stream as defined by the ISO 13818-1 MPEG specification. Output from the error correction and packet synchronization module 24 is directed to the packet demultiplexer 25.

The packet demultiplexer 25 is an integrated circuit that accepts the packetized, time domain multiplexed data stream of the MPEG-2 transport stream and routes the packets to various areas within satellite receiver 12. Video is output as video stream 26, and is accepted by the video decompresser 28. Audio is output as audio stream 27, and is accepted by the audio decompresser 30. Audio stream 27 and video stream 26 are fully compliant audio and video program Elementary Streams as defined by ISO 13818-2 and ISO 13818-3 of the MPEG-2 standard, respectively. Data 29 is output from demultiplexer 25 and is routed to central processing unit (CPU) 16, which assembles it into the EPG 22 stored in memory 18. In addition to routing packets, packet demultiplexer 25 also descrambles encrypted data, various buffering of the MPEG data, and Program Clock reference handling to keep the local clock synchronized with the clock at the uplink center.

Video decompresser 28 and audio decompresser 30 accept video stream 26 and audio stream 27, respectively, and decompress them. The video stream 26 is fed to video digital to analog converter 32 and the audio stream 27 is then fed to audio digital to analog converter 34. The converters 32 and 34 convert the digital streams into analog baseband signals which are then output to TV/monitor 36 and VCR device 38.

In the preferred embodiment, EPG 22 is stored in memory 18 and contains information including names or titles of viewing events, corresponding channel numbers and names, brief descriptions of the programs, program initiation and termination information, rating and content information and IR codes specific to individual models of VCRs. The VCR IR list 35 is separated from EPG data by CPU 16 and stored in memory 18. EPG 22 and the VCR IR code list 35 are updated at regular intervals by CPU 16 from data 29.

To display information contained in EPG 22, CPU 16 executes the instruction set 20, which in the preferred embodiment may be implemented through software and stored in memory 18. CPU 16 takes EPG 22 information stored in memory 18 and outputs a graphics bit map file 21 to display processor 17. Display processor 17 processes the bit map file 21 and outputs a signal, which after being passed through filter 19 becomes a video signal that may be combined with video signal 26 to be displayed as desired on television/monitor 36. In the preferred embodiment, a DOT 3041 microprocessor may be used for CPU 16. Also in the preferred embodiment, display processor 17, used to display the information contained in EPG 22, may be an MPEG decoder, such as the LSI 64002.

A user is allowed to select from the displayed EPG information any of the desired programming selections contained in EPG 22. User input may be supplied through keypad 9, which is located on the satellite receiver 12 and is connected directly to CPU 16. User input may also be supplied via a remote control 31, which sends an infrared signal to remote receiver 33, located on the satellite receiver 12. Remote receiver 33 decodes the received signal and sends the command to the CPU 16.

Similarly, the user is allowed to select from the VCR IR code list 35 for the specific VCR which they are using. The CPU 16 executes instruction set 20 and accesses the VCR IR code list 35 information stored in memory 18. The CPU 16 then outputs a graphics bit map file 21 to display processor 17 which processes the bit map file 21 and outputs a signal. This signal is passed through filter 19 which converts it to a video signal that may be combined with video signal 26 to be displayed as desired on television/monitor 36.

User input may again be supplied through keypad 9, which is located on the satellite receiver 12 and is connected directly to CPU 16. User input may also be supplied via a remote control 31, which sends an infrared signal to remote receiver 33, located on the satellite receiver 12. Remote receiver 33 decodes the received signal and sends the command to CPU 16.

The EPG selections 7 and VCR IR code selection 11 are used to control the operation of the VCR 38, and are stored in nonvolatile memory 15. As new programming information is received via data 29, CPU 16 checks updated EPG 22 information against the EPG selections 7 stored in nonvolatile memory 15. In the preferred embodiment, nonvolatile memory 15 may be flash memory, conventional RAM utilizing a battery backup, or ferroelectric memory.

In the event that there is a match between a broadcast occurrence and a programming selection stored in nonvolatile memory 15, CPU 16 directs IR generator 23 to use the stored VCR IR code selection 11 to transmit IR signals to VCR 38. The IR generator 23 provides a high powered IR signal which can be broadcasted so as to remotely operate and control the VCR without special connections. In the present invention, microcontrollers such as those manufactured by Toshiba or LSI and integrated into most television remote control devices may be acceptable for use as the IR code generator in IR generator 23. It is intentional that a beamed IR signal aimed directly at the VCR 38 or a wired IR generator attached to the VCR will not be necessary. It has been found that a high powered IR generator can be used to blanket or saturate the room or local area with the desired IR control signal which will be picked up by the VCR IR receiver to control the VCR operation.

Figure 2:
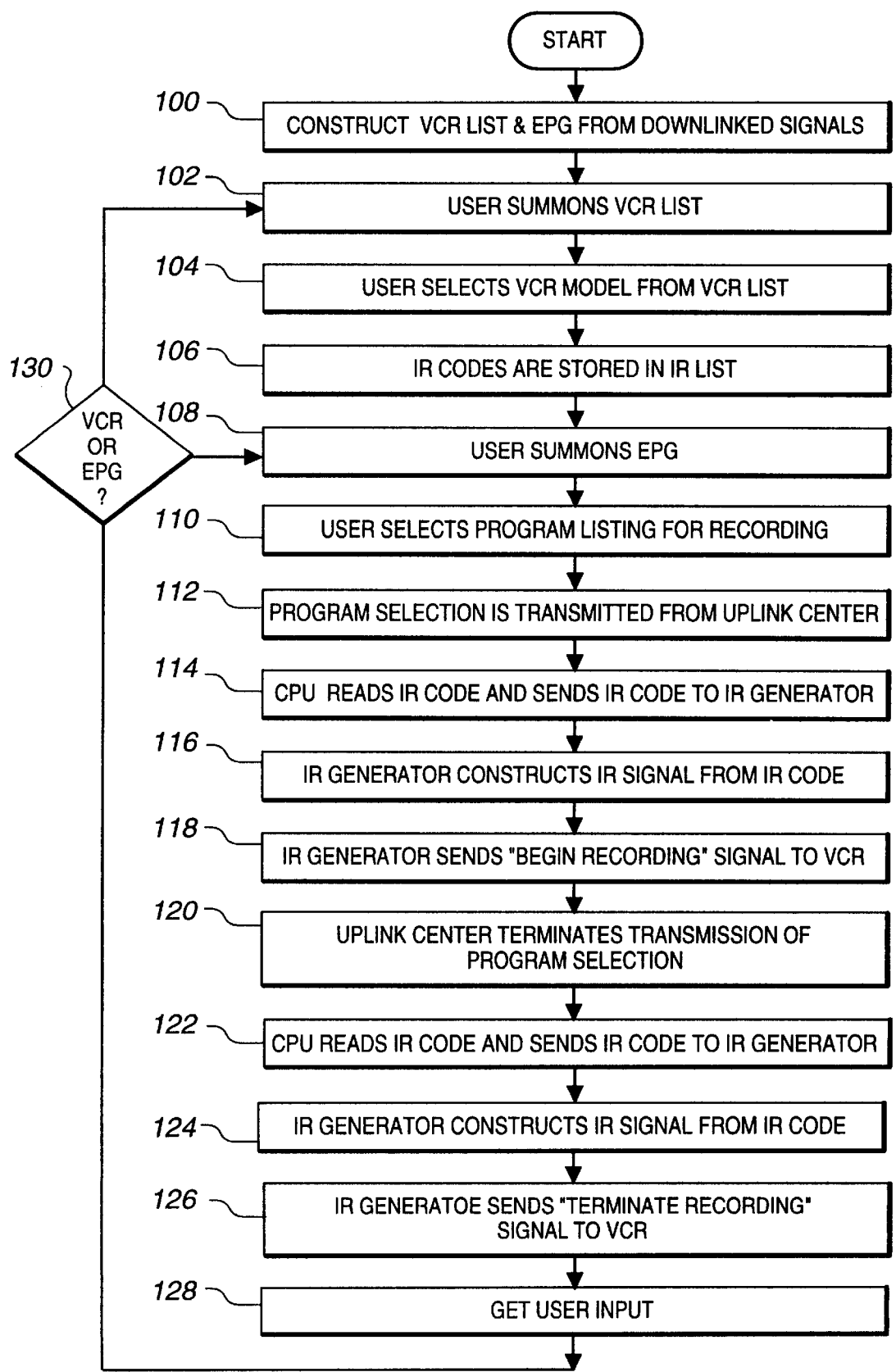
FIG. 2 is flow chart illustrating the logical sequence of steps for program selection and control of the VCR in the preferred embodiment of the present invention.

Referring to FIG. 2, the logical sequence of steps of operation of the present invention will be described using a flow chart. In general, these operations may be implemented by executing instruction set 20 on the CPU 16. At step 100, the VCR IR code list 35 and EPG 22 are constructed from data 29 contained in the downlinked signals 3. Both the VCR IR code list 35 and EPG 22 may be updated at any time by data 29, thus including new model VCRs and reflecting last minute changes to the EPG 22. At step 102, the user summons the VCR IR code list 35 to be displayed on the TV/monitor 36. The VCR IR code list 35 will contain all VCR models which may be controlled by IR signals. Continuing to step 104, the user selects a VCR model from the displayed VCR model list corresponding to the VCR IR code list 35. The displayed VCR model list disappears from the TV/monitor 36 and a VCR IR code selection 11 corresponding to IR signals that control the selected model VCR 15 stored in nonvolatile memory 15 (step 106).

At step 108, the user summons the EPG 22. EPG information is displayed on the TV/monitor 36. At step 110, the user may select program listings from the EPG 22 that correspond to programming selections the user wishes to record with VCR 38. EPG selections 7 are stored in nonvolatile memory 15. The CPU 16 then monitors the data 29 downlinked signals 3 to determine when the programming selection corresponding to an EPG selection 7 begins. At step 112, the uplink center 1 begins transmission of the programming selection that matches the EPG selection 7. The recording process thereby begins when the programming selection is actually aired, and not necessarily when it was originally scheduled to begin. Thus, the present invention allows for real-time schedule changes to occur for both starting time and stopping time, such as a sporting event which goes into overtime, and ensures the entire program will be recorded (assuming sufficient tape is available), unlike current recording devices which record only at a specific predetermined start time for a predetermined length.

Continuing to step 114, the CPU 16 reads the VCR IR code selection 11 and sends the code that corresponds to "begin recording" to the IR generator 23. At step 116, the IR generator 23 constructs an IR signal based on the IR code received from the CPU 16. The IR generator then sends a "begin recording" IR signal to the VCR 38 (step 118). This instructs the VCR 38 to begin recording the channel containing the concurrently transmitted programming selection that matches the EPG selection 7. The CPU 16 continues to monitor the data 29 from downlinked signals 3 until step 120, where the uplink center 1 finishes the transmission of the programming selection being recorded. At step 122, the CPU 16 again reads the VCR IR code selection 11 and sends the code corresponding to "terminate recording" to the IR generator 23. At step 124, the IR generator 23 constructs an IR signal from the IR code passed to it by the CPU 16. The IR generator 23 then transmits a "terminate recording" IR signal to the VCR 38.

Program control continues to step 128, where user input is received once again. At step 130 the user input is analyzed. If the user wishes to change the model VCR that is currently selected, program control is returned to step 102. However, if the user wishes to program the VCR 38 to record another program listed in the EPG22, program control is returned to step 108.

While the illustrations in the this application have been directed toward satellite television applications, it is to be understood that the present invention may be used in applications such as cable television, including wired and wireless types, off-air broadcasting including HDTV and local area systems. Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. A method for controlling via signal transmission the operation of a recording device so as to record a program selected from electronic programming information, said method comprising the steps of:
   (a) providing a data stream comprising:
      (1) audio-visual information comprising audio and video signals;
      (2) said electronic programming information program schedule listings and program initiation and termination information; and
      (3) recording device codes for generating control signals for controlling said recording device;
   (b) processing said data stream comprising the steps of:
      (1) monitoring said data stream;
      (2) updating said electronic programming information; and
      (3) updating said recording device codes;
   (c) displaying to a user said program schedule listings from said electronic programming information;
   (d) allowing a user to select at least one program schedule listing from said electronic programming information;
   (e) allowing a user to select at least one recording device code from said recording device codes; and
   (f) transmitting said control signals corresponding to said selected recording device code, in synchronization with said program initiation and termination information, to control in real time said recording device to record a program corresponding to said selected program schedule listing consistent with changes in said electronic programming information.

2. A method for controlling as described in claim 1, wherein said step of transmitting further comprises the steps of:

(a) generating a plurality of said control signals corresponding to said selected recording device code corresponding to said recording device; and (b) broadcasting said plurality of control signals to said recording device, wherein said plurality of control signals are comprised of high powered infrared energy, broadcasted to saturate the local area surrounding said recording devise.

3. A method for controlling as described in claim 1, wherein said step of processing further comprises the step of storing in a first memory said electronic programming information and said recording device codes.

4. A method for controlling as described in claim 1, further comprising the step of storing in a second memory said selected programming schedule listing and said selected recording device code.

5. A method for controlling as described in claim 4, wherein the second memory is a nonvolatile memory.

6. An apparatus for controlling a recording device via transmission of control signals so as to record an audio-visual program or other information selected from electronic programming information contained in a data stream, said data stream comprising audio and video information, said data stream comprising recording device codes for creating said control signals, said data stream comprising said electronic programming information, said electronic programming information comprising program schedule listings and program initiation and termination information, said apparatus comprising:

(a) a signal processing means for receiving and processing said data stream;

(b) a signal generating means, said signal generating means capable of generating and transmitting a plurality of said control signals to said recording device based on said recording device codes; and (c) a central processing means comprising:
(1) a microprocessor means;
(2) a memory means comprising an instruction means;
(3) a user interface means comprising:
(A) a display means for displaying said program schedule listings and said recording device codes to a user;
(B) a program schedule listing selection means for allowing a user to select at least one program schedule listing from said program schedule listings; and
(C) a recording device code selection means for allowing a user to select at least one recording device code from said recording device codes;
(4) an updating means for updating said electronic programming information and said recording device codes; and
(5) a control means controllably interconnecting said signal processing means, said signal generating means and said central processing means according to instructions of said instruction means, said control means providing for real time actuation of functions of said recording device in synchronization with said program initiation and termination information consistent with changes in said electronic programming information.

7. The apparatus for controlling as defined in claim 6, wherein said plurality of control signals are comprised of high powered infrared energy, broadcasted to saturate the local area surrounding said recording device.

8. The apparatus for controlling as defined in claim 6, wherein said memory means further comprises:

(a) a volatile memory means; and (b) a nonvolatile memory means.

9. The apparatus for controlling as defined in claim 8, wherein said volatile memory means contains said electronic programming information and said recording device codes from said data stream.

10. The apparatus for controlling as defined in claim 8, wherein said nonvolatile memory means contains at least one said selected program schedule listing.

11. The apparatus for controlling as defined in claim 8, wherein said nonvolatile memory means contains said selected recording device code.

12. An apparatus for controlling an independent audio-visual or other electronic informational device, said independent device capable of being controlled by infrared energy signals, said apparatus comprising a signal generating means, said signal generating means capable of generating and transmitting a plurality of control signals to said independent device, wherein said plurality of control signals are comprised of high powered infrared energy, broadcasted to saturate the local area surrounding said independent device.

13. The apparatus for controlling as defined in claim 12, which further comprises:

(a) a signal processing means for receiving and processing a data stream, said data stream comprising infrared device codes corresponding to a plurality of said independent devices for creating said plurality of control signals;

(b) a central processing means comprising:
(1) a microprocessor means;
(2) a memory means comprising an instruction means;
(3) a user interface means comprising:
(A) a display means for displaying said infrared device codes to a user; and
(B) an infrared device code selection means for allowing a user to select at least one infrared device code from said infrared device codes corresponding to said plurality of independent devices;
(4) an updating means for updating said infrared device codes; and
(5) a control means provided by said instruction means, said control means controllably interconnecting said signal processing means, said signal generating means and said central processing means, said control means providing for actuation of functions of said independent device.

14. The apparatus for controlling as defined in claim 13, wherein said memory means further comprises:

(a) a volatile memory means; and (b) a nonvolatile memory means.

15. The apparatus for controlling as defined in claim 14, wherein said volatile memory means contains said infrared device codes from said data stream.

16. The apparatus for controlling as defined in claim 14, wherein said nonvolatile memory means contains said selected infrared device code.

* * * * *